United States Patent
Wilson et al.

(10) Patent No.: US 6,728,764 B1
(45) Date of Patent: Apr. 27, 2004

(54) METHOD AND APPARATUS FOR OPERATING A DATA PROCESSING SYSTEM

(75) Inventors: Kristine J. Wilson, Arden Hills, MN (US); Mark A. Wiggins, St. Paul, MN (US); Gail L. Johnson, White Bear Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 724 days.

(21) Appl. No.: 09/708,323

(22) Filed: Nov. 8, 2000

(51) Int. Cl.[7] .............................................. G06F 15/177
(52) U.S. Cl. ........................ 709/220; 709/223; 345/733
(58) Field of Search ................................. 709/217–219, 709/223–224, 220; 719/321; 345/520, 522, 733, 761, 764, 773, 778

(56) References Cited

U.S. PATENT DOCUMENTS

| | | | |
|---|---|---|---|
| 5,339,450 A | | 8/1994 | Nagahara |
| 5,535,326 A | * | 7/1996 | Baskey et al. ................. 714/4 |
| 5,574,914 A | * | 11/1996 | Hancock et al. ............ 712/220 |
| 5,590,314 A | * | 12/1996 | Ueno et al. ................. 719/321 |
| 5,592,676 A | | 1/1997 | Bonnafoux |
| 6,047,289 A | * | 4/2000 | Thorne et al. ................. 707/10 |
| 6,314,501 B1 | * | 11/2001 | Gulick et al. ............... 711/153 |
| 6,640,272 B1 | * | 10/2003 | Hartwell et al. ............ 710/104 |

OTHER PUBLICATIONS

XP–002206777—InDepth—Using xinetd.

* cited by examiner

Primary Examiner—Mehmet B. Geckil
(74) Attorney, Agent, or Firm—Charles A. Johnson; Mark T. Starr; Crawford Maunu, PLLC

(57) ABSTRACT

A method and apparatus for operating a data processing system. The data processing system hosts an operating system which is coupled to a management interface processor. The management interface processor is further coupled to a network along with a plurality of workstations. One or more logical console objects are instantiated on the management interface processor. Respectively associated with and coupled to the one or more logical console objects are one or more instances of a system operations program. The instances of the system operations programs provide a user-interface for console level operations of the data processing system. The instances of the system operations program can be rehosted amongst the workstations, thereby aiding in workload balancing and resiliency.

20 Claims, 8 Drawing Sheets

US 6,728,764 B1

METHOD AND APPARATUS FOR OPERATING A DATA PROCESSING SYSTEM

FIELD OF THE INVENTION

The present invention generally relates to the operation of data processing systems, and more particularly to remote and distributed operation of a data processing system.

BACKGROUND OF THE INVENTION

Data processing systems have historically required operator control for the day to day operations of the host processor. Prior art system operations interfaces have included an operation console directly coupled to the system. A typical console included a keyboard for entry of control commands, a plurality of selector switches, one or more banks of indicator lamps, and a CRT display for providing system status information to the operator.

In various instances, the operation console is the means through which an operator can enter commands to the operating system. In addition, the operator can monitor messages coming from the operating system. This permits the operator to gather system information and undertake a number of tasks, ranging from booting or restarting the system to user and file management.

In systems such as the 2200 Series data processing systems from Unisys, multiple operations consoles can be configured, each supporting a different operational function with respect to the system. For example, separate consoles can be configured for magnetic tape management, user management, and file management. For each console, a physical hardware device has historically been required.

Products such as the Single Point Operations (SPO) software available from Unisys Corporation have provided a centralized and a remote interface for operating data processing systems. In a system having multiple operations consoles, the SPO software supports a remote and centralized interface for interacting with the multiple consoles via a network. A network couples the workstation that hosts the SPO software to the hardware devices that implement the separate consoles. The SPO arrangement, as well as other arrangements, have relied on the presence of physical devices for the consoles, thereby adding to hardware and software maintenance costs.

A method and apparatus that addresses the aforementioned problems, as well as other related problems, are therefore desirable.

SUMMARY OF THE INVENTION

In various embodiments, the invention provides a method and apparatus for operating a data processing system. The data processing system hosts an operating system which is coupled to a management interface processor. The management interface processor is further coupled to a network along with a plurality of workstations. One or more logical console objects are instantiated on the management interface processor. Respectively associated with and coupled to the one or more logical console objects are one or more instances of a system operations program. The instances of the system operations programs provide an interface for console level operations of the data processing system. The instances of the system operations program can be rehosted amongst the workstations, thereby aiding in workload balancing and resiliency.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
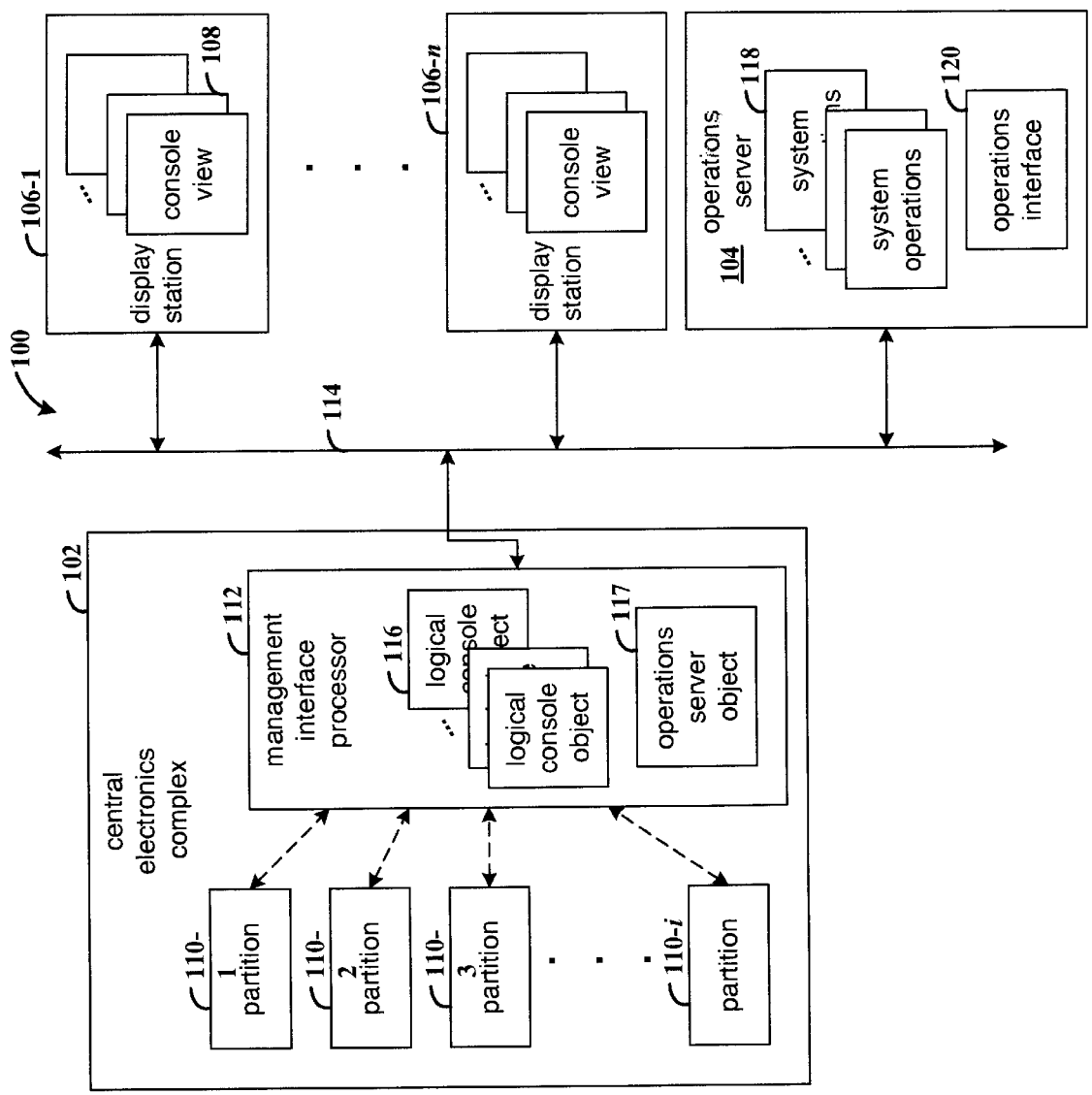
FIG. 1 is a functional block diagram of a data processing arrangement including a data processing system that is operable via a plurality of logical consoles in accordance with one embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

In various embodiments of the invention, a method and apparatus are provided for operating a data processing system. A management interface processor is coupled to the operating system(s) of one or more data processing systems. For example, some data processing systems, such as CPIX Series systems from Unisys, can be partitioned into multiple, independent data processing systems (each referred to as a "partition"). The management interface processor hosts one or more logical console objects for the respective partitions of the data processing system.

The logical console objects are coupled, via a network for example, to instances of system operations programs that execute on various workstations on the network. The system operations programs are portable across workstations and manage the interface with the operating system. The separation of the logical console objects from the instances of the system operations programs provides flexibility in deploying the instances on suitable workstations on the network. Thus, the workload can be balanced between workstations and operators. Furthermore, upon failure of a workstation the system operations program can be restarted on another workstation.

FIG. 1 is a functional block diagram of a data processing arrangement including a data processing system that is operable via a plurality of logical consoles in accordance with one embodiment of the invention. Data processing arrangement 100 includes a central electronics complex 102, operations server 104, and multiple display stations 106-1–106-n. The console views 108 provide the user interface for operations of the systems defined by partitions 110-1–101-i.

In one embodiment, central electronics complex 102 is a large-scale data processing system, such as the CPIX Series data processing systems from Unisys. Central electronics complex 102 can be configured into multiple partitions 110-1–110-i. Each of the partitions is itself a data processing system which is controlled by an instance of an operating system (not shown).

Management interface processor 112, in one embodiment, is a Windows NT computer that is disposed in the cabinetry (not shown) that encases central electronics complex 102. Other hardware and software combinations may be suitable for implementing the management interface processor in other embodiments. Each of partitions 110-1–110-i is coupled to management interface processor 112, and the instances of the operating systems executing on the partitions are coupled to software that executes on the management interface processor 112. The management interface processor also includes a network interface (not shown) for connecting to network 114.

Management interface processor 112 hosts object-oriented software that instantiates logical console objects 116 and one or more operations server objects 117. The operating system on each of partitions 110-1–110-i may have one or more associated logical console objects, depending on partition specific configuration characteristics. For example, some partitions may be configured to have dedicated operations consoles for viewing and managing messages directed to the handling of magnetic tapes.

Management interface processor 112 provides a communication path between the operating systems of the various partitions 110-1–110-i and the instances of the system operations program 118. When a console is created, a logical console object is instantiated, and the logical console object is connected to an instance of a system operations program when the console is activated. In the interest of brevity, an instance of the system operation program will sometimes be referred to as the "logical console." This should not be confused with the logical console object that is hosted on the management interface processor 112.

The logical console objects 116 are associated with respective instances of system operations program 118. An instance of a system operations program manages message transfer between an associated logical console and one or more console views 108, and in another embodiment supports automation of system operations. In one embodiment, the system operations program implements the capabilities found in the Friendly Console and Auto-action Message System software components that are available from Unisys. The instances of the system operations program are hosted on one or more workstations 104 and are launched by the operations interface program 120. Each workstation that hosts one or more instances of a system operations program also hosts an operations interface program.

The operations interface program 120 manages the instances of the system operations program operating on the same operations server 104. In response to control directives from management interface processor 112, instances of system operations program 118 are started and stopped by operations interface 120. In addition, connection status messages are sent between the operations interface and the corresponding operations server object 117 on the management interface processor for the purpose of maintaining a mapping of the logical console objects and the operations server(s) 104 hosting the associated instance of the system operations program. That is, the management interface processor tracks which logical consoles are associated with which partitions and on which workstations the instances of the system operations program execute.

The console views 108 are GUIs that support manual operation of the data processing system(s). More than one console view may be open for a particular logical console, and input commands/data can be entered from any of the views. In one embodiment, the console views are implemented as X-windows.

It will be appreciated that the logical nature of the console objects 116 and the portability of the console views 108, instances of system operations 118, and operations interface program enhances flexibility in the operation of partitions 110-1–110-i. For example, network 114 may be a LAN, WAN, or world-wide network, thereby offering remote operations of the partitions. In addition, the operations interface 120 may be hosted on a number of workstations, thereby distributing the workload, both from a computational resource perspective and from an operator perspective.

Socket-based communication is used between the various components in arrangement 100, thereby permitting the components to be distributed across the network. In an alternative embodiment, Microsoft's DCOM can be used.

Figure 2:
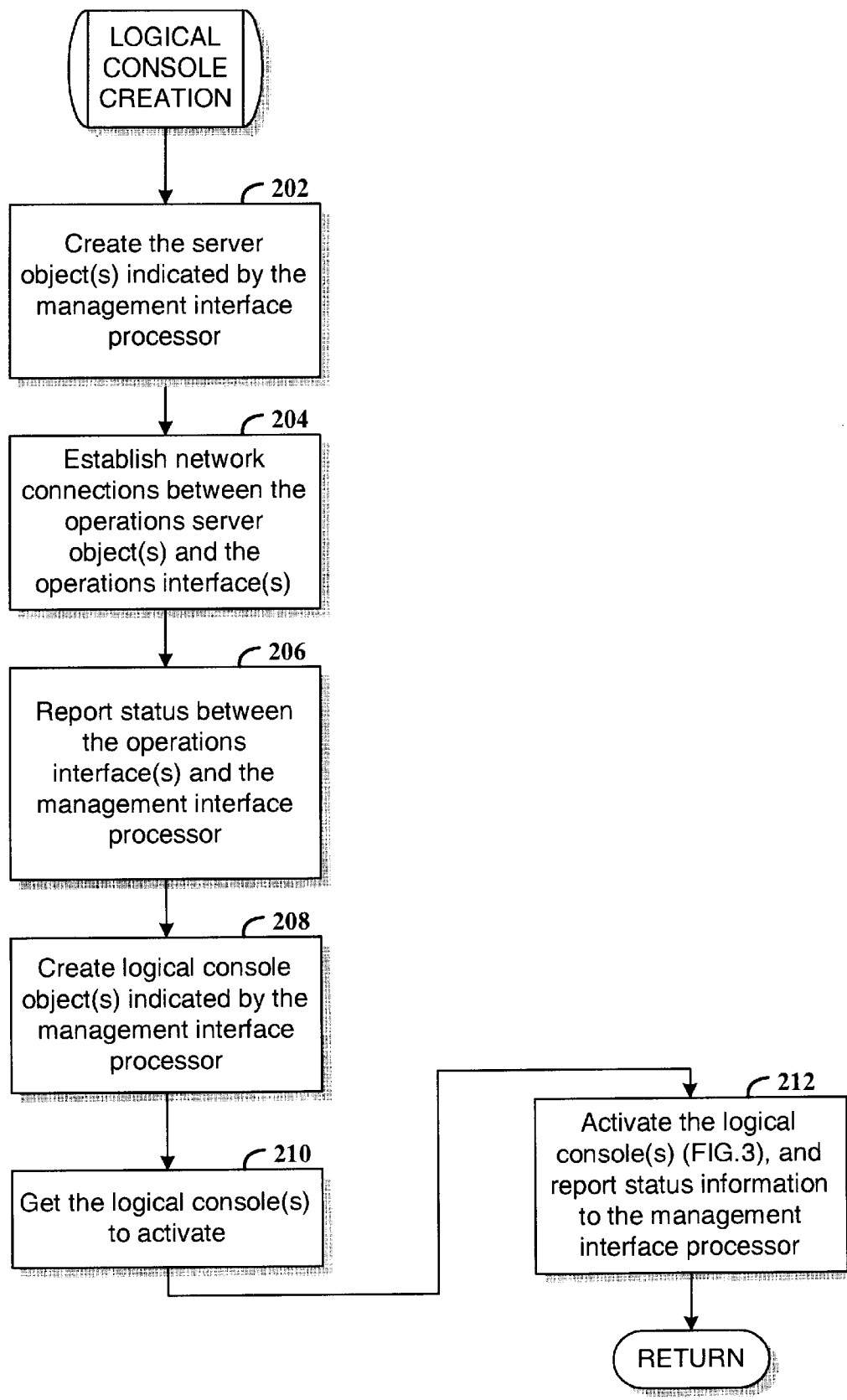
FIG. 2 is a flowchart of an example process for creating a logical console in accordance with one embodiment of the invention.

FIG. 2 is a flowchart of an example process for creating a logical console in accordance with one embodiment of the invention. The process generally entails creating and instantiating the software components that are needed to create a logical console for operation of a data processing system.

At step 202, one or more operations server objects 104 are created by the management interface processor 112. In one embodiment, the management interface processor may be pre-configured with the identities of the operations servers. In another embodiment, the identities of the operations servers may be entered interactively by a user. The operations interface listens for a connection request from the operations server object.

At step 204, a network connection is established between the operations server object and the operations interface program. Note that if there is more than one operations interface program to which to connect (as defined in the management interface processor), then connections are also established with these operations interface programs. At step 206, the operations interface program(s) report status information to the operations server object. For example, the operations interface program(s) reports the identities of the logical consoles that were last hosted on the associated operations server.

At step 208, the management interface processor 112 creates one or more logical console objects 116, and at step 210 gets the identities of the logical console(s) to be activated. The logical console(s) are activated at step 212, as further described in FIG. 3. The activation status is then reported to the management interface processor before the process is complete.

Figure 3:
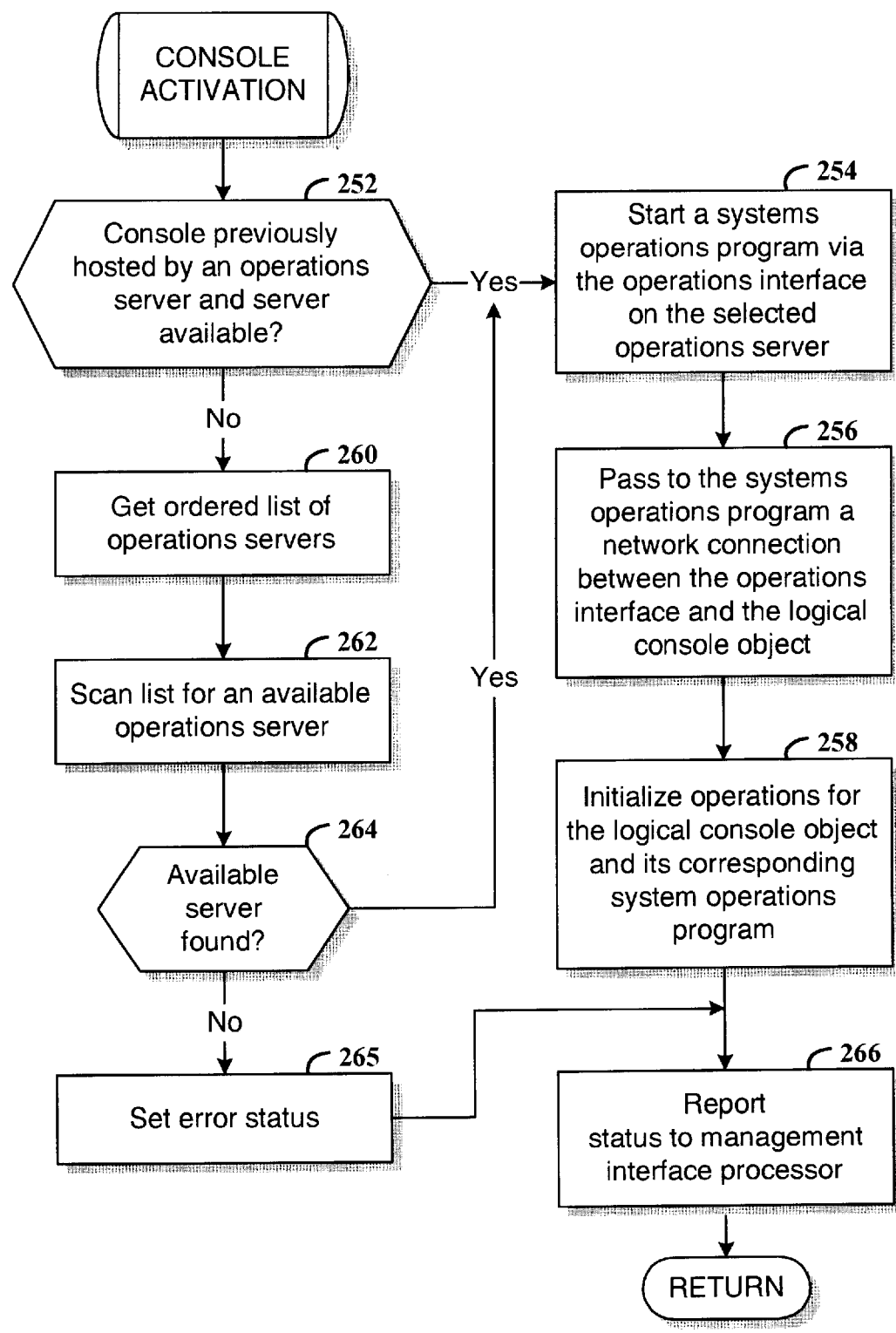
FIG. 3 is a flowchart of an example process for activating a logical console for operation of the data processing system.

FIG. 3 is a flowchart of an example process for activating a logical console for operation of the data processing system. The process generally entails starting an instance of a system operations program and establishing a connection between the instance of the system operations program and the associated logical console object.

Decision step 252 tests whether the console was previously hosted by an operations server 104 and whether that server is available. If the console was previously hosted and the server is available, control is directed to step 254. At step 254, the operations interface 120 is instructed by the management interface processor to start an instance of the system operations program on the server. The operations interface then passes to the instance of the system operations program the network connection to use with the associated logical console object. At step 258, the logical console object and associated instance of the system operations program are initialized for beginning operations of the data processing system. The console activation status is then reported to the management interface processor at step 266 before returning control to the process that initiated the console activation.

If either the console has not been previously hosted or the operations server on which it was previously hosted is unavailable, decision step 252 directs control to step 260. At step 260, the known operations servers are identified, which in the example embodiment is in the form of an ordered list. At step 262, the list of operations servers is scanned and the servers are probed for availability. If an available operations server is found decision step 264 directs control to step 254 to start an instance of the systems operations program, as described above. Otherwise, at step 265 an error status is set and reported to the management interface processor at step 266. Control is then returned to the process that initiated console activation.

Figures 4, 4A:
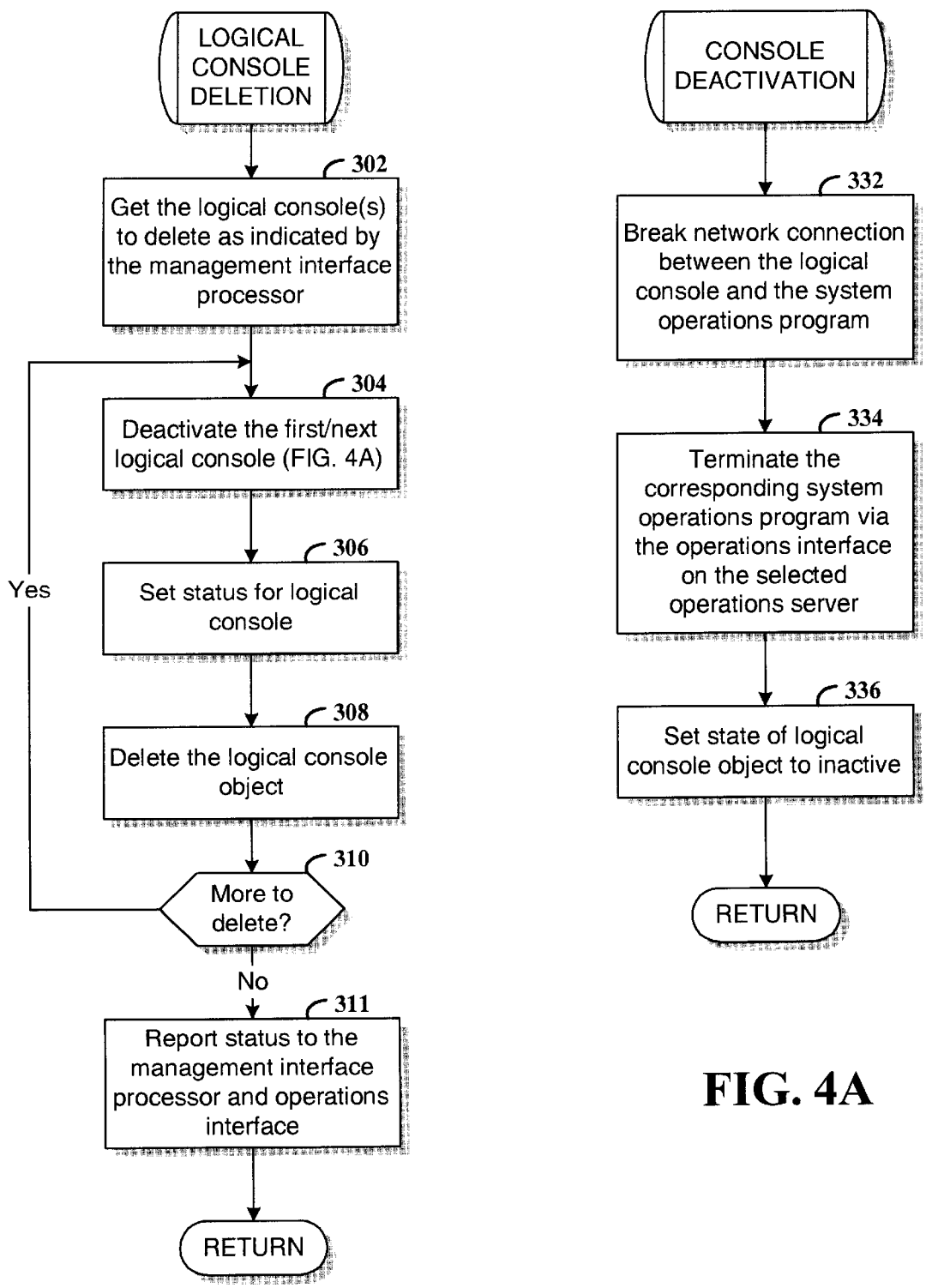
FIG. 4 is a flowchart of an example process for deleting a logical console.
FIG. 4A is a flowchart of an example process for deactivating a logical console.

FIG. 4 is a flowchart of an example process for deleting a logical console. The process begins at step 302 where the identity(s) of the logical console(s) to delete is obtained from the management interface processor. In one embodiment, the deletion process may commence in response to a user directed request to the management interface processor. Steps 304, 306, 308, and 310 illustrate the process for deletion of multiple logical consoles.

At step 304, the first logical console (or next if in the midst of deleting multiple logical consoles) is deactivated as further described in FIG. 4A. The status of the deactivation is then set to inactive, as shown at step 306. At step 308, the logical console object is deleted by the management interface processor. If there are more logical consoles to delete, control is returned to step 304. Otherwise, control is directed to step 311 where the status of the deletion process is reported to the management interface processor. Control then returns to the process from which the deletion process was initiated, for example, a user interface process.

FIG. 4A is a flowchart of an example process for deactivating a logical console. At step 332, the network connection between the designated logical console object and the associated instance of the system operations program is broken. The management interface processor 112 then instructs the operations interface program 120 on the operations server 118 that hosted the instance of the system operations program to terminate the system operations program. The state of the logical console object on the management interface processor is then set to inactive at step 336 before returning control to the initiating process.

In addition to deactivating a console during the process of console deletion, a logical console can also be deactivated in response to a command or system action to the management interface processor 112.

Figure 5:
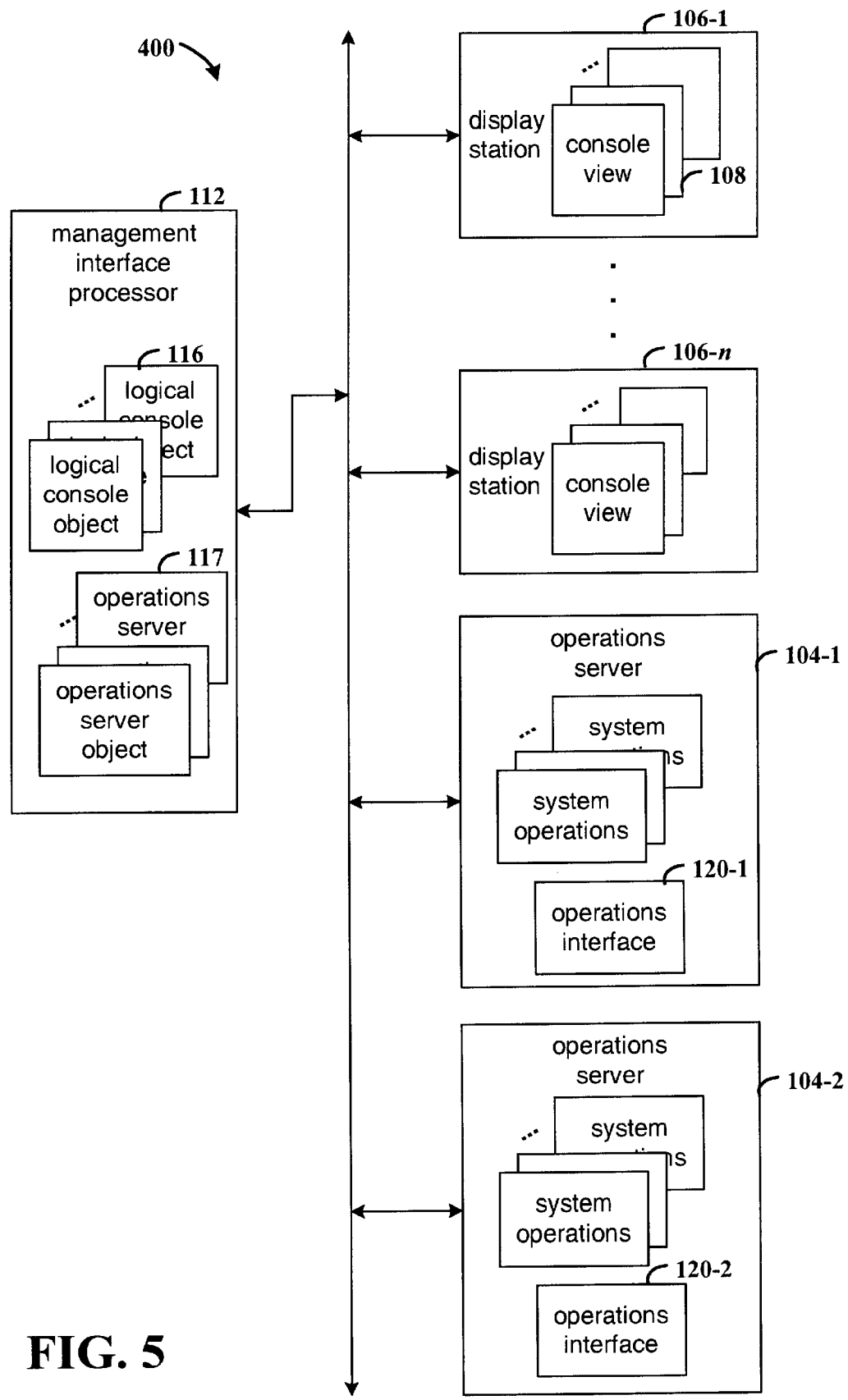
FIG. 5 is a functional block diagram that illustrates a data processing arrangement in which multiple logical consoles are hosted by multiple operations servers.

FIG. 5 is a is a functional block diagram that illustrates a data processing arrangement in which multiple logical consoles are hosted by multiple operations servers. The flexibility and portability of console operations that are supported by the present invention can be seen from the arrangement of software elements in FIG. 5. Along with multiple display stations 106-1–106-n, arrangement 400 includes multiple operations servers 104-1 and 104-2. While only two are shown, it will be appreciated that additional operations servers could be deployed for further balancing of the workload.

Having multiple operations servers 104-1 and 104-2 provides flexibility in managing the workload on the various workstations that host the software. For example, if operations server 104-1 becomes overburdened with instances of system operations programs, one or more of the instances of the system operations program can be rehosted to an alternative operations server, for example 104-2. The particular network environment in which arrangement 400 is deployed may also bear on whether a logical console (i.e., instance of the system operations program) should be rehosted. For example, other network traffic may impede the flow of messages between the system operations program and the associated logical console object to the extent that operations are impaired. Thus, one or more logical consoles can be rehosted on an operations server on a separate LAN (not shown) if desirable.

It can also be seen from arrangement 400 how recovery of console operations is available in various embodiments of the invention. If an operations server fails, for example, another may be available for recovery of console operations. The logical console object(s) can report such an error to the management interface processor. In response, the management interface processor can have instance(s) of the system operations program started on an alternative operations server.

In another embodiment (not shown), a single operations server 104 hosts an operations interface 120 for multiple management interface processors 112. That is, an operations interface 120 on an operations server 104 provides its services for multiple management interface processors. Thus, systems operations interfaces may be flexibly and economically provided for multiple central electronics complexes (102 in FIG. 1) using one or more operations servers.

Figure 6:
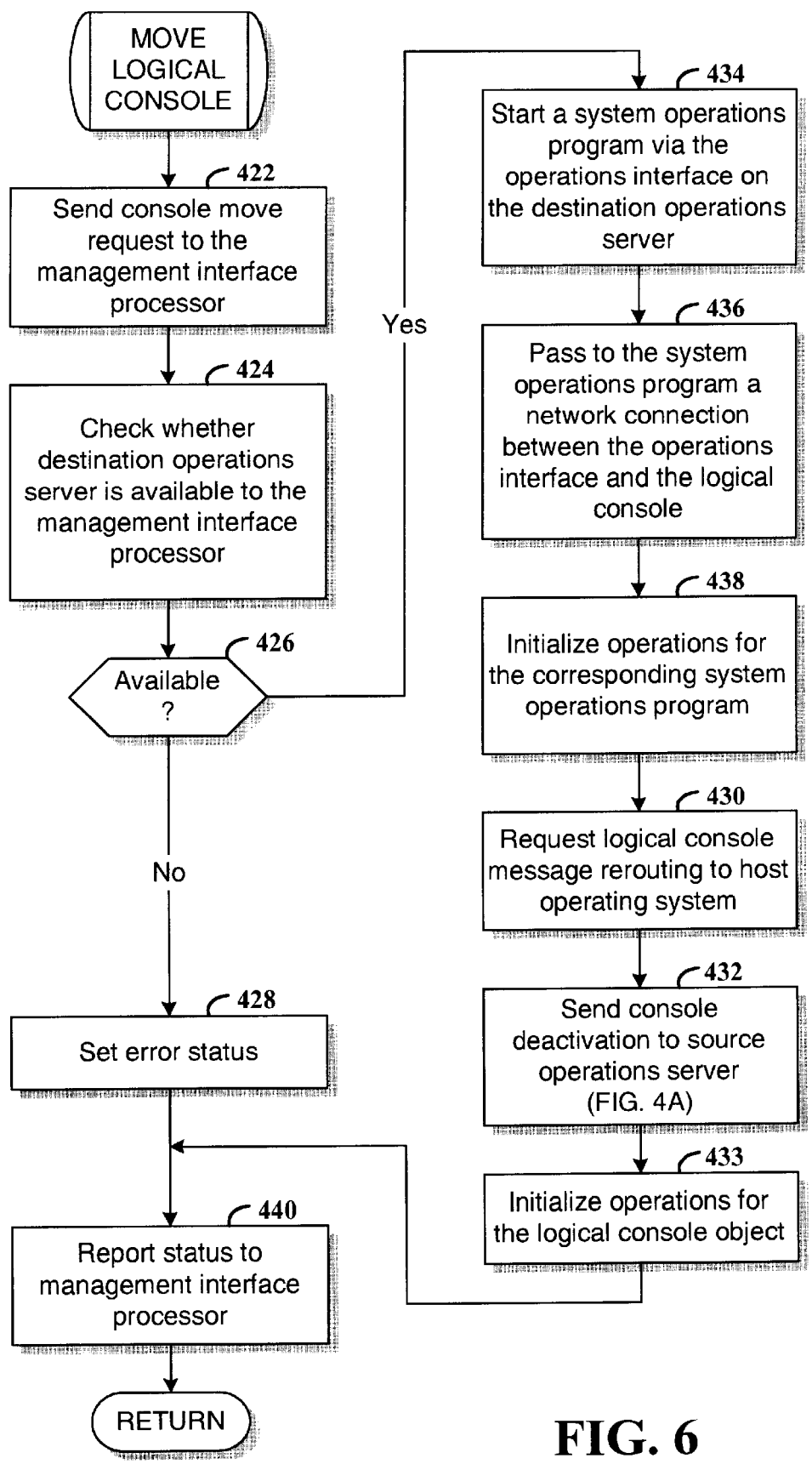
FIG. 6 is a flowchart of an example process for moving a logical console from one operations server to another.

FIG. 6 is a flowchart of an example process for moving a logical console from one operations server to another. The process begins at step 422 where a move request is sent to the management interface processor. The move request identifies the logical console, the operations server from which the logical console is to be moved (source), and the operations server to which the logical console is to be moved (destination). The move request may be initiated, for example, from an operations interface to the management interface processor.

At step 424, the management interface processor checks whether the destination operations server is in communication with the management interface processor. For example, the management interface processor checks the status of its network connections with the operations interface on the destination. If the destination operations server is unavailable, decision step 426 directs control to step 428 where an error status set. At step 440, the status is reported to the management interface processor prior to returning control to the calling process.

If the destination operations server is available, control is directed to step 434. At step 434, the management interface processor requests that the operations interface on the destination operations server start an instance of the system operations program. The operations interface then passes to the instance of the system operations program a network connection for the associated logical console object (step 436). At step 438, the instance of the system operations program, on the destination operations server, is initialized. At step 430, a request is submitted from the management interface processor to the host operating system for messages to be rerouted. The original logical console is then deactivated by sending a deactivation request to the operations interface on the source operations server, as shown by step 432 and as further described in FIG. 4A. At step 433, the logical console object is initialized for the logical console on the destination operations server. Control is then directed to step 440 as described above.

Figure 7:
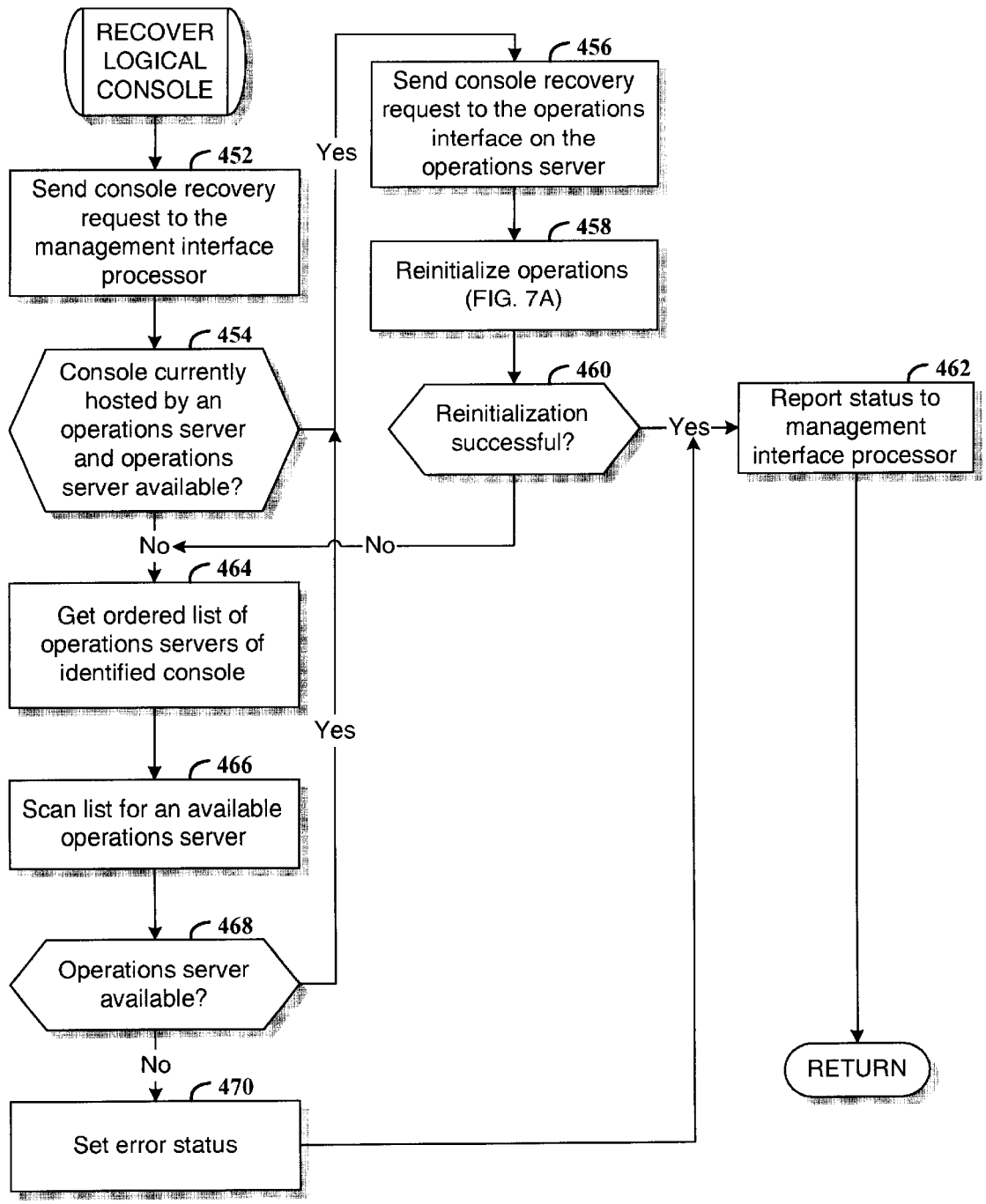
FIG. 7 is a flowchart of an example process for recovering a logical console.

FIG. 7 is a flowchart of an example process for recovering a logic console. In the event of a failure of a logical console or failure of an operations server, a logical console can be restarted or rehosted at the direction of the management interface processor. At step 452, a console recovery request is sent from the partition, for example, to the management interface processor. The console recovery request identifies the logical console to be recovered. Decision step 454 tests whether the logical console to be recovered is currently hosted by an operations server and whether there is an alternative operations server available. If so, control is directed to step 456.

At step 456, a console recovery request is sent to the operations interface 120 on the operations server 104 that originally hosted the logical console. The logical console is then reinitialized at step 458 (further described in FIG. 7A). If the reinitialization was successful, decision step 460 directs control to step 462, where the status is reported to the management interface processor. If the reinitialization of the logical console failed, decision step directs control to step 464.

Decision step 454 also directs control to step 464 if either the logical console is not hosted by an operations server or the associated operations server is unavailable. At step 464 the list of operations servers is obtained, and at step 466 the list is scanned for an available operations server. If an available operations server is found, decision step 468 directs control to step 456, and processing proceeds as described above. Otherwise, at step 470 an error status is set, which is then reported to the management interface processor at step 462. The management interface processor reports the error status to the partition.

Figure 7A:
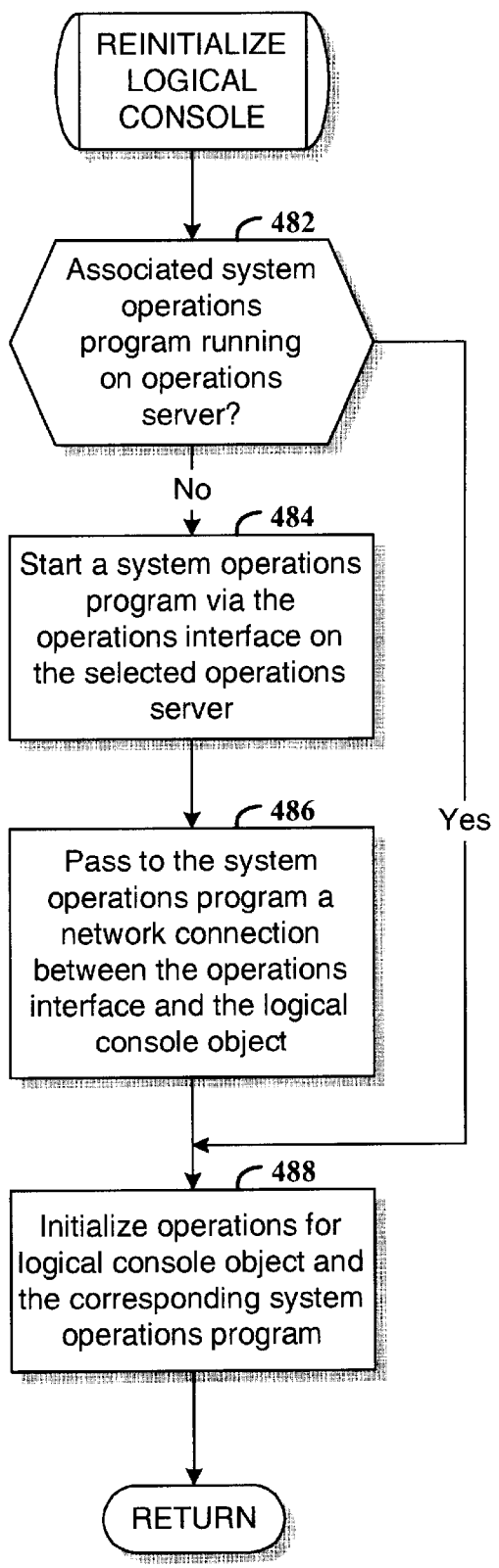
FIG. 7A is a flowchart of an example process for reinitializing a logical console during a recovery process.

FIG. 7A is a flowchart of an example process for reinitializing a logical console during a recovery process. Having already identified a logical console, decision step 482 first checks whether the instance of the system operations program is currently running on the operations server 104. If not, control is directed to step 484, where an instance of the system operations program is started on the selected operations server via the operations interface 120. At step 486, the operations interface passes to the instance of the system operations program the network connection to use with the associated logical console object. The logical console object and instance of the system operations program are then initialized at step 488 before returning to the controlling process.

Accordingly, the present invention provides, among other aspects, a method and apparatus for operating a data processing system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for operating a data processing system, the data processing system arranged to host an operating system which is coupled to a management interface processor, wherein the management interface processor is coupled to a network having a plurality of workstations coupled thereto, comprising:

instantiating on the management interface processor one or more logical console objects;

initiating on one or more selected ones of the workstations respective instances of a system operations program for the logical console objects;

coupling the one or more instances of the system operations program to the logical console objects; and providing an operations interface to the operating system via the one or more instances of systems operations programs.

2. The method of claim 1, further comprising:

upon detecting an unresponsive instance of a system operations program, automatically reinitiating a replacement instance of the system operations program on a selected one of the workstations; and coupling the replacement instance of the system operations program to a logical console object.

3. The method of claim 2, further comprising:

attempting to restart an instance of the system operations program on a workstation that initially hosted the unresponsive instance of the system operations program; and upon failure to restart the unresponsive instance of the system operations program on the workstation that initially hosted the unresponsive instance of the system operations program, automatically selecting an alternative workstation and initiating replacement instance of the system operations program on the alternative workstation and coupling the replacement instance of the system operations program to a logical console object.

4. The method of claim 2, further comprising:

responsive to a move request referencing a first instance of a system operations program and a destination workstation, performing steps (a)–(c);

(a) deactivating communications between the first instance of a system operations program and an associated logical console object;

(b) starting a second instance of a system operations program on the destination workstation; and (c) coupling the second instance of a system operations program to the associated logical console object.

5. The method of claim 4, further comprising:

checking whether the destination workstation is available; and reporting an error if the destination workstation is unavailable.

6. The method of claim 1, further comprising:

responsive to a move request referencing a first instance of a system operations program and a destination workstation, performing steps (a)–(c);

(a) deactivating communications between the first instance of a system operations program and an associated logical console object;

(b) starting a second instance of a system operations program on the destination workstation; and (c) coupling the second instance of a system operations program to the associated logical console object.

7. The method of claim 6, further comprising:

checking whether the destination workstation is available; and reporting an error if the destination workstation is unavailable.

8. The method of claim 1, further comprising:

establishing one or more instances of operations interface programs on the one or more workstations, respectively;

coupling the management interface processor to the one or more instances of operations interface programs; and initiating the instances of the system operations program via the operations interface programs and responsive to the management interface processor.

9. The method of claim 8, further comprising, for each instance of the system operation program, providing to the instance of the system operations program a network connection with an associated logical console object.

10. An apparatus for operating a data processing system, the data processing system arranged to host an operating system which is coupled to a management interface processor, wherein the management interface processor is coupled to a network having a plurality of workstations coupled thereto, comprising:

means for instantiating on the management interface processor one or more logical console objects;

means for initiating on one or more selected ones of the workstations respective instances of a system operations program for the logical console objects;

means for coupling the one or more instances of the system operations program to the logical console objects; and means for providing an operations interface to the operating system.

11. A computer-implemented method for operating a partitioned data processing system, each partition including a processor arrangement hosting an operating system which is coupled to a management interface processor, wherein the management interface processor is coupled to a network having one or more workstations coupled thereto, comprising:

instantiating on the management interface processor respective sets of logical console objects for each partition of the data processing system;

initiating on one or more selected ones of the workstations respective instances of a system operations program for the logical console objects;

coupling the instances of the system operations program to the logical console objects; and providing an operations interface for the partitions via the instances of the systems operations program.

12. The method of claim 11, further comprising:

upon detecting an unresponsive instance of a system operations program, automatically reinitiating a replacement instance of the system operations program on a selected one of the workstations; and coupling the replacement instance of the system operations program to a logical console object.

13. The method of claim 12, further comprising:

attempting to restart an instance of the system operations program on a workstation that initially hosted the unresponsive instance of the system operations program; and upon failure to restart the unresponsive instance of the system operations program on the workstation that initially hosted the unresponsive instance of the system operations program, automatically selecting an alternative workstation and initiating replacement instance of the system operations program on the alternative workstation and coupling the replacement instance of the system operations program to a logical console object.

14. The method of claim 11, further comprising:

responsive to a move request referencing a first instance of a system operations program and a destination workstation, performing steps (a)–(c);

(a) deactivating communications between the first instance of a system operations program and an associated logical console object;

(b) starting a second instance of a system operations program on the destination workstation; and (c) coupling the second instance of a system operations program to the associated logical console object.

15. The method of claim 14, further comprising:

checking whether the destination workstation is available; and reporting an error if the destination workstation is unavailable.

16. An apparatus for operating a partitioned data processing system, each partition including a processor arrangement hosting an operating system which is coupled to a management interface processor, wherein the management interface processor is coupled to a network having one or more workstations coupled thereto, comprising:

means for instantiating on the management interface processor respective sets of logical console objects for each partition of the data processing system;

means for initiating on one or more selected ones of the workstations respective instances of a system operations program for the logical console objects;

means for coupling the instances of the system operations program to the logical console objects; and means for providing an operations interface for the partitions.

17. A computing arrangement for operating a data processing system, the data processing system arranged to host an operating system, comprising:

a management interface processor coupled to the operating system, the management interface processor configured and arranged to host a plurality of logical console objects;

a network coupled to the management interface processor;

a plurality of workstations coupled to the network;

a plurality of instances of a system operations program operable on selected ones of the workstations, each instance of the system operations program coupled via the network to an associated one of the logical console objects and configured to provide an operations interface to the operating system.

18. The computing arrangement of claim 17, wherein the management interface processor is configured and arranged to detect an unresponsive instance of a system operations program and automatically reinitiate a replacement instance of the system operations program on a selected one of the workstations.

19. The computing arrangement of claim 18, further comprising:

means for attempting to restart an instance of the system operations program on a workstation that initially hosted the unresponsive instance of the system operations program; and means for automatically selecting an alternative workstation and initiating replacement instance of the system operations program on the alternative workstation and coupling the replacement instance of the system operations program to a logical console object upon failure to restart the unresponsive instance of the system operations program on the workstation that initially hosted the unresponsive instance of the system operations program.

20. A computing arrangement, comprising:

a plurality of data processing systems, each data processing system hosting an operating system;

a plurality of management interface processors coupled to the operating systems, respectively, each management interface processor configured and arranged to host a plurality of logical console objects;

a network coupled to the management interface processors;

a plurality of workstations coupled to the network;

a plurality of instances of a system operations program operable on selected ones of the workstations, each instance of the system operations program coupled via the network to an associated one of the logical console objects and configured to provide an operations interface to the operating systems.

* * * * *